United States Patent
Castagno et al.

(10) Patent No.: US 7,403,991 B2
(45) Date of Patent: Jul. 22, 2008

(54) SYSTEM, METHOD AND TERMINAL FOR MEASURING THE QUALITY OF SERVICE IN A TELECOMMUNICATIONS NETWORK

(75) Inventors: Mauro Castagno, Turin (IT); Marco Tosalli, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 10/503,483

(22) PCT Filed: Feb. 3, 2003

(86) PCT No.: PCT/EP03/01037

§ 371 (c)(1),
(2), (4) Date: Aug. 3, 2004

(87) PCT Pub. No.: WO03/067816

PCT Pub. Date: Aug. 14, 2003

(65) Prior Publication Data

US 2005/0097205 A1    May 5, 2005

(30) Foreign Application Priority Data

Feb. 6, 2002    (IT) .......................... TO2002A0101

(51) Int. Cl.
*G06F 15/173* (2006.01)
(52) U.S. Cl. ........................ 709/224; 709/203; 709/225; 709/229; 709/231; 455/452.2; 370/252
(58) Field of Classification Search ................. 709/203, 709/223–225, 229, 231; 370/395.21, 252; 455/452.2
See application file for complete search history.

(56) References Cited

U.S. PATENT DOCUMENTS

| 6,021,439 | A | 2/2000 | Turek et al. |
| 6,223,221 | B1 * | 4/2001 | Kunz ........................... 709/224 |
| 6,308,216 | B1 * | 10/2001 | Goldszmidt et al. ......... 709/236 |
| 6,556,565 | B1 * | 4/2003 | Ward et al. ................... 370/356 |
| 2002/0055999 | A1 * | 5/2002 | Takeda ......................... 709/224 |
| 2002/0065922 | A1 * | 5/2002 | Shastri ......................... 709/227 |
| 2002/0069037 | A1 * | 6/2002 | Hendrickson et al. ........ 702/186 |
| 2003/0148768 | A1 * | 8/2003 | Kakani et al. ................ 455/452 |

FOREIGN PATENT DOCUMENTS

| EP | 0 786 883 | | 7/1997 |
| EP | 0 849 912 | | 6/1998 |
| KR | 2002010346 A | * | 2/2002 |
| WO | WO 00/64108 | * | 10/2000 |
| WO | WO 01/39419 | | 5/2001 |
| WO | WO 02/39673 | | 5/2002 |

* cited by examiner

*Primary Examiner*—Oanh Duong
(74) *Attorney, Agent, or Firm*—Andrew Wilford

(57) ABSTRACT

The present invention relates to a system (10), method and terminal (14) for measuring the quality of service or QoS for services, for example, of the Internet type in which a telecommunications network (12) supports the delivery of the services by a server (16). The system (10) and the corresponding method allow to collect by means of the network (12, 18, 20) the QoS information, in particular information of insufficient QoS, to identify the causes of insufficient QoS and to discriminate in the attribution of said causes among the terminal (14), the server (16) or the network itself (12). The terminal (14) in addition to generating "objective" information about the QoS, such as the time for downloading a Web page, dimensions of the Web page and number of objects composing the page, is also able to generate "subjective" information, indicative of the actual QoS perceived by a user of the terminal (14).

8 Claims, 3 Drawing Sheets

SYSTEM, METHOD AND TERMINAL FOR MEASURING THE QUALITY OF SERVICE IN A TELECOMMUNICATIONS NETWORK

CROSS REFERENCE TO RELATED APPLICATIONS

This application is the US national phase of PCT application PCT/EP03/01037, filed 3 Feb. 2003, published 14 Aug. 2003 as WO 03/067816, and claiming the priority of Italian patent application TO2002A000101 itself filed 6 Feb. 2002.

FIELD OF THE INVENTION

The present invention relates to a system, method and terminal for measuring the Quality of Service (QoS), for instance, for Internet services, as indicated in the preamble to the independent claims.

In particular, the present invention relates to a system and a method for monitoring QoS in mobile telecommunications networks (mobile networks) which allow a user to make use of Internet services as well as to a terminal able to measure QoS information, for example, during Web Browsing functions.

BACKGROUND OF THE INVENTION

Systems and methods are known for monitoring QoS in transferring information (data) between a client terminal or user and an Internet server.

For example, U.S. Pat. No. 6,021,439 discloses a system and method in which an Internet Service Provider (ISP) associates to predefined Web pages appropriate enabling keys able both to activate, at the client terminal, predefined programs for collecting QoS parameters, and to transmit the collected parameters to the Service Provider.

A first problem shared by known systems and methods for collecting the QoS consists of the fact that such systems and methods provide for the collection of specific QoS parameters of the Service Providers, neglecting parameters linked to the characteristics and functionality of the telecommunications network supporting the Internet services.

This approach, which is typical of known systems and methods, is substantially unsatisfactory because it neglects one of the essential elements of QoS for Internet services; QoS depends on the various architectural elements that participate or contribute to the use of Internet services, i.e. in part on devices or parameters under the Service Provider's control, in part on devices or parameters linked to the telecommunications network and to those responsible for its operation (operator), in part on devices or parameters associated to the type of terminals or connections used by the clients themselves.

In other words, since all the architectural elements that participate or contribute to the use of Internet services can cause an insufficient QoS, there is the problem of having available tools able to discriminate the causes of insufficient QoS attributing the responsibility individually to said architectural elements.

An additional problem of the prior art, in particular in the case of Internet services on mobile networks, consists of the fact that the transmission of QoS parameters is limited to Service Providers only, while the clients of these types of services tend to ascribed the responsibility for insufficient QoS, not to the Service Provider, but to the network operator who, however, not having adequate tools available, due to the limited nature of known systems and methods, is incapable of identifying the causes of said insufficient QoS.

Therefore, the problem exists of making available to network operators, and not only to Service Providers, in particular in the case of mobile networks, adequate tools for collecting and managing QoS information.

Another problem of the prior art resides in the fact that the terminals generally used to transmit the measurements are able to transmit absolute QoS information, for instance, in terms of transfer times, number of Web pages transferred and so on, while for network operators, in particular in the case of mobile networks, but also for the Service Provider, it would be important to know subjective parameters, i.e. parameters indicative of clients' actual perception.

OBJECT OF THE INVENTION

The aim of the present invention is a system, corresponding method, terminal and computer product that allow in particular network operators to collect QoS parameters, to discriminate the causes and the corresponding architectural elements causing insufficient QoS, and to determine the actual QoS perceived by clients.

SUMMARY OF THE INVENTION

The aim is achieved by the system, method, terminal and computer product for measuring Quality of Service (QoS) wherein according to a first characteristic of the present invention, the system and corresponding method allow one to maintain updated clients' terminals in such a way that the collection of the parameters of insufficient QoS and the corresponding analysis are constantly kept homogeneous and/or consistent.

According to another characteristics of the present invention, the system and corresponding method allow one to identify, thanks to a particular structure of a supporting data base, the causes of insufficient QoS and to discriminate in the attribution of said causes between the Internet Server, the telephone network and the client's terminal, i.e. between the individual architectural elements that contribute to the use of the Internet services.

According to an additional characteristic of the present invention, each client's terminal is able to determine, in particular, subjective parameters indicative of the QoS as perceived by clients.

BRIEF DESCRIPTION OF THE DRAWINGS

This and other characteristics of the present invention shall become readily apparent from the following description of a preferred embodiment, provided purely by way of non limiting example with the aid of the accompanying drawings, in which.

BEST MODE FOR CARRYING OUT THE INVENTION

Figure 1:
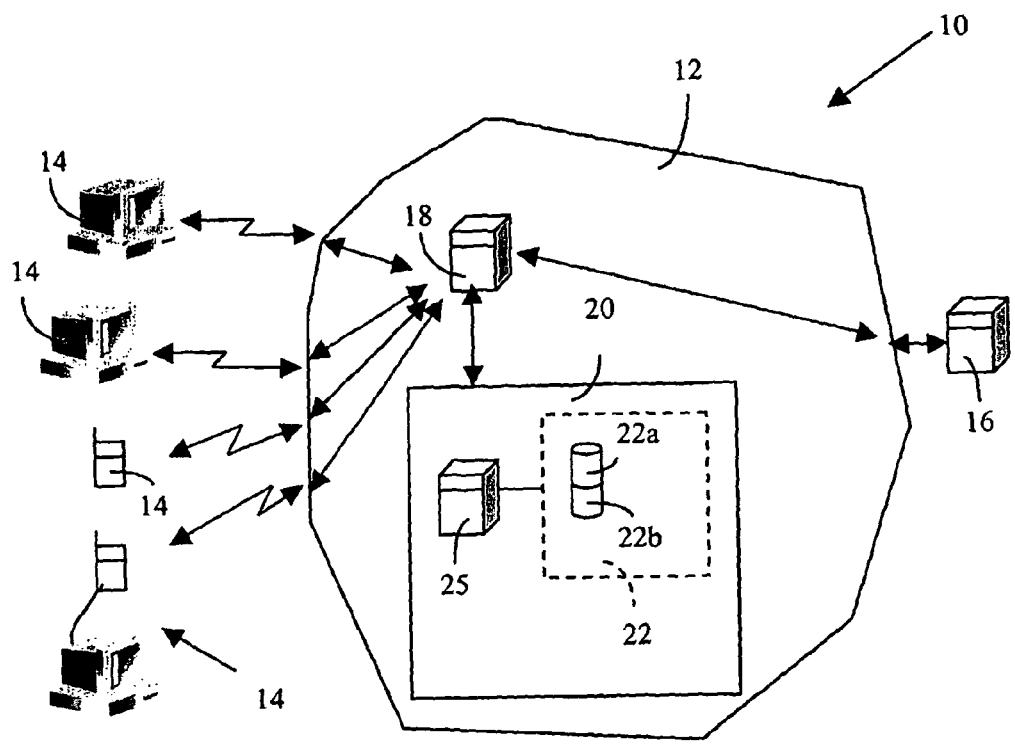
FIG. 1 shows a general block diagram of a system for measuring the Quality of Service.

With reference to FIG. 1, a system 10 for measuring the Quality of Service (QoS), for example, for Internet services, comprises user terminals (terminals) 14 associated with respective clients, Internet apparatuses or Servers (Internet Servers) 16 associated with Internet Service Providers or ISP, a telecommunications network (network) 12 associated with a network Operator.

The network 12 allows, in known fashion, the interconnection of the terminals 14 to the Internet Servers 16 and comprises, in accordance with the present embodiment, network apparatuses (control units) 18 and an apparatus for managing the Quality of Service (QoS Server) 20, considered a possible characteristic element of the present invention.

The terminals 14, known from the hardware viewpoint, are constituted, for instance, by mobile terminals, by personal computers (PC) connected to mobile terminals, by PCs or, in general, by terminals able to handle Internet functionalities such as searches on the network (web Browsing), electronic mail (E-Mail) and data transfer (File Transfer).

The terminals 14 are able to connect, in known fashion, to an Internet server 16, accessing the operator's network, for instance, by means of predefined telephone numbers, in the case of fixed networks or GSM (Global System for Mobile communication) networks or by means of PDP Context (Packet Data Protocol) procedures, in the case of GPRS (General Packet Radio Service) networks.

The terminals 14 comprise, in accordance with the present embodiment, processing modules (terminal modules) constituted by program modules, for example written in a known programming language, such as C++, and are able, as shall be described in detail hereafter, to interact with Internet functionalities, to collect or generate, and possibly to transmit to the QoS Server 20, information or parameters representative of the QoS perceived by the client, and to interact with the QoS server 20 to keep updated the modules for collecting the QoS parameters.

In particular, according to a first possible characteristic of the present invention, the terminal modules are able to:

detect, in known fashion, the activation of Internet functionalities, for instance of the Web Browsing type, independently from the type of page and/or ISP in use;

request, if need be, the client's consent to measure and transmit QoS parameters;

detect or generate QoS parameters, as shall be described in detail hereafter; and transmit to the QoS server 20, by means of appropriate processes for connection to the QoS server 20, QoS information or parameters collected or generated, in particular if said QoS parameters are below predefined quality thresholds; this, naturally, in order to limit traffic towards the QoS server 20 itself.

Naturally, although it is preferable that the terminal 14 transmit only parameters of insufficient QoS, nothing prohibits the terminal 14 from transmitting, in general, the QoS information generated during the use of functionalities, for example, of the Internet type.

The generation of the QoS parameters, according to further possible characteristic elements of the present invention, comprises, for instance, the following steps:

measuring the time "t" for downloading a complete page, for instance in seconds;

measuring the dimensions "d" of the page, for instance in bytes;

measuring the number "c" of objects composing the page;

applying a correlation function F(t, d, c) able to estimate the value Q of the QoS as perceived by the client by means of an expression of the type Q=F(t, d, c); and comparing the value of Q with $Q_{RIF}$ values indicative of a minimum acceptable level of quality.

According to a preferred embodiment, the correlation function Q=F(t, d, c) can, for instance, be determined a priori and experimentally, on a statistical basis, with the collaboration of a significant sample of clients and be stored in the terminal 14 in the form of table with the variation of discrete intervals of t (columns) and S (rows) as shown below (Tab. 1).

TABLE 1

| δ | t | | | | |
|---|---|---|---|---|---|
| | 0-5 | 5-10 | 10-20 | 20-30 | >30 |
| 0-100 | 4 | 3 | 2 | 0 | 0 |
| 100-200 | 4 | 4 | 2 | 1 | 0 |
| 200-300 | 4 | 4 | 2 | 2 | 0 |
| >300 | 4 | 4 | 3 | 2 | 0 |

The values of S in Tab. 1 are determined by means of the following linear expression 1]:

$$\delta = (d/1000) + c \qquad 1]$$

The values on Tab. 1 are representative of the level of QoS perceived by the clients in the various operative conditions and correspond to the values of Q as defined. In the example, the value of Q fall between 0 and 4; to high values of Q, for example between 3 and 4, corresponds a high quality of service as perceived by the client, whereas to low values, for instance between 0 and 2, corresponds an insufficient QoS as perceived by the client.

Through the use of a correlation function of the kind described above, it is thereby possible to associate to objective parameters of the QoS the subjective parameter Q, thus indicative of the QoS as perceived by the clients.

The transmission of the parameters of QoS can be performed by setting up, in known fashion by means of the terminal modules, in parallel to the connection to the Internet server 16, a concurrent connection to the QoS server 20 in such a way as to transmit, for instance in encrypted and secure fashion, the parameters of insufficient QoS to the QoS server 20.

The terminal modules, according to a further possible characteristic element of the present invention, are able to be updated and/or replaced with new modules, for example by the QoS server 20.

In fact, it is possible for the QoS server 20, as shall be described in detail hereafter, to dynamically update the correlation function F(t, d, c) and the $Q_{RIF}$ levels with variations, for instance, of parameters known to the network 12 such as:

type of connection between terminal 14 and network 12, for example connection of the circuit type, GPRS 2+1, GPRS 3+1, etc.;

performance level subscribed by the client; and other similar characteristics.

Naturally, the above description is applicable in similar fashion to Internet functionalities other than Web Browsing.

Thanks to said additional characteristic, it is thus possible for the telephone operator to modify dynamically, as service conditions vary, the terminal modules in such a way as to identify the causes of insufficient QoS as perceived by the client.

The control units 18, of known type, are part, for instance, of a GSM/GPRS network 12 and comprise units of GGSN (Gateway GPRS Support Node) type, SGSN (Serving GPRS Support Node) type and HLR (Home Location Register) type; such units are able to allow the exchange of data and commands between the terminals 14, the Internet server 16 and the QoS server 20 by means of the connections established by the terminal 14.

The SGSN and HLR units, as is well known, further comprise reference databases containing parameters that, according to present embodiment, can be collected by the QoS server 20, as shall be described in detail hereafter.

In general, the control units 18 are able, according to present example of embodiment, to allow both the retrieval of reference information and the transmission to the QoS server 20 of some parameters, collected by the terminals 14, useful to the implementation of the system and method according to the invention, such as: indicator of consent to the handling of QoS parameters (status indicator);

identifier of the calling terminal 14;

URL identifier requested by the client;

notification of the start and end of the connection.

The QoS server 20 is constituted, for example, by an electronic computer (computer) 25, known in itself, for instance a Pentium® III computer with dual CPU, 512 Mbytes internal Ram and Windows® NT operating system and a known subsystem of disks (disk) 22, connected to the processor 25 and able to store, for example in a first zone 22a, reference databases and, in a second zone 22b, processing or program modules (server modules) developed during the design of the system 10 to identify, in particular, the causes of insufficient QoS as measured by the terminals 14.

According to the present embodiment, the reference databases stored in the first zone 22a of the disk 22 comprise:

a QoS database able to contain, stored therein, the QoS or insufficient QoS data as transmitted by the client terminals 14;

a service database (active client database) able to contain, stored therein, instant by instant, indicative information of the active clients on services of the Internet type;

an address database able to contain, stored therein, the URL (Uniform Resource Locator) address identifying, as is well known, Internet systems or Internet resources.

The server modules, stored in the zone 22b of the disk 22, comprise:

interface modules able to interface the control unit 18;

at least a data collection module able to selectively detect the activation of an Internet connection by the terminal 14 of a determined client;

store any QoS data transmitted by the client terminal 14 in the QoS data base in order to process said data in subsequent steps;

keep updated the active client data base;

at least a data management module able to read the information stored in the QoS data base;

read the information present in the active client data base;

transmit to the terminals 14, in selective fashion, the terminal modules or update them if necessary;

transmit to the terminals 14, in selective fashion, new correlation functions or update them if necessary;—transmit to the terminals 14, in selective fashion, new QRIF values representative of the levels of minimum acceptable quality if necessary;

modify the status of a terminal 14 in selective fashion, for example deactivating its monitoring of perceived QoS;

update the address data base if necessary;

process the data of insufficient QoS stored in the QoS data base in order to initiate, as shall be described in detail hereafter, actions to correct the detected and stored deficiencies.

In order to better clarify the characteristics of the present invention, an example of structure of the QoS data base is provided hereafter along with some examples of the processing operations that can be conducted automatically through the analysis of the data stored in the QoS data base.

In a preferred embodiment, the QoS data base comprises, stored for instance in the form of a table, strings of elementary information or records able to be indexed individually relating to conditions of insufficient QoS; each record comprises the following elementary information or fields:

a field indicative of the client from whom the parameters of insufficient QoS have arrived;

a field or time reference indicative of the instant in which the parameters of insufficient perceived QoS were transmitted to the QoS server 20;

a field or reference K indicative of the type of terminal and/or of the type of connection used by the client;

a field or reference F indicative of the correlation function in use by the client;

a field or value Q corresponding to the level of insufficient QoS measured by the client terminal 14 and transmitted to the QoS server 20;

a field or value $Q_{RIF}$ indicative of the level of acceptable minimum acceptable quality in use by the client; fields comprising the absolute values of "t", "d" and "c" as measured by the client terminal 14 and corresponding to the level of insufficient QoS;

a field or value of URL indicative of the address of the Internet service corresponding to the situation of insufficient level of QoS;

a field or reference P indicative of the position of the terminal 14 in the territory.

As is readily apparent to a person versed in the art, each record comprises both elementary information transmitted by the terminals 14 and other information collected, for example, by the operator through the control units 18 or other apparatuses belonging to the network 12.

For example, the elementary information about the position of the terminal 14 can be collected by the QoS server 20, in known fashion, by querying, in the case of GSM/GPRS networks, the data bases of the SGSN and HLR units.

Having available the data base QoS constructed, for instance, in the indicated manner, it is possible, as shall be described in detail hereafter, to conduct automatic processing operations able both to identify in selective fashion the problems and the causes of insufficient QoS and, if need be, to solve them.

A first example of analysis (200) is able to allow one to identify, with a determined time interval and analyzing the data base QoS, the causes of insufficient QoS due to the characteristics of the Web pages used by the clients or to the ISP.

Figure 2:
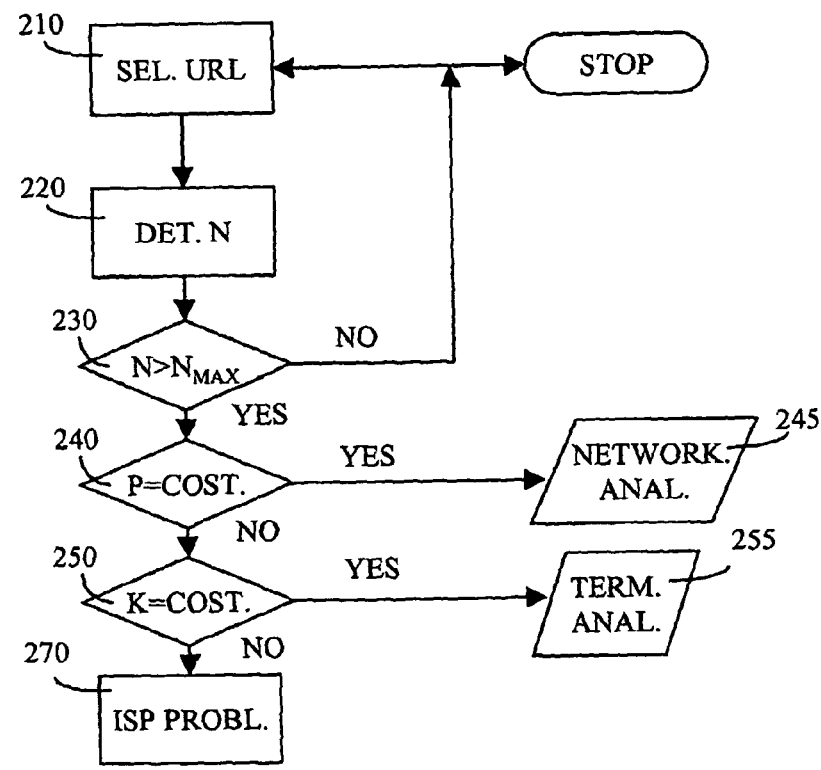
FIG. 2, FIG. 3 and FIG. 4 show flow charts relating to the functions of the QoS server of the system of FIG. 1.

Said analysis (200) comprises the steps of:

selecting a determined URL address (FIG. 2, step 210), for example a URL of frequent use and/or indicated by some clients as not meeting QoS requirements;

determining the number of records N (step 220) present in the QoS data base corresponding to the selected URL having identical or equivalent F and $Q_{RIF}$;

comparing the number N thus determined with a maximum number Nma, predetermined or determined on each occasion (step 230);

if N is smaller than or equal to Nma (negative outcome of the comparison), repeating the procedure by selecting an additional URL (step 210) or completing the analysis function if there are no other URLs to select (step STOP);

if N is greater than Nma (positive outcome of the comparison), mutually comparing the references P (step 240) indicative of the area in relation to the N records determined in the step 220;

if P is identical or equivalent (CONSTANT) for all N records (positive outcome), starting a network analysis procedure aimed at verifying any connection problems in the identified area P (step 245);

if the reference P is diversified (NOT CONSTANT) for the N records (negative outcome), mutually comparing the references K (step 250) indicative of the characteristics of the terminals and/or of the type of connection;

if the reference K is identical or equivalent (CONSTANT) for all N records (positive outcome), starting an analysis procedure aimed at verifying any problems due to the type of terminal 14 (FIG. 1, FIG. 2) and or of connection identified (step 255); if the reference K is diversified (NOT CONSTANT) for the N records (negative outcome), assigning to the URL address being analyzed an unreliability or reduced QoS parameter and transmitting a signaling to the corresponding ISP and, as the case may be, to the client (step 270).

A second example of analysis (300) is able to allow one to identify, with a determined time interval and analyzing the QoS database, the causes of insufficient QoS due to the telephone operator.

This type of analysis (300) is particularly useful in the case of mobile terminals able to use, for instance, Internet services by means of GSM/GPRS technology (Global System for Mobile communication/General Packet Radio Service) or UMTS technology (Universal Mobile Telecommunication System).

Figure 3:
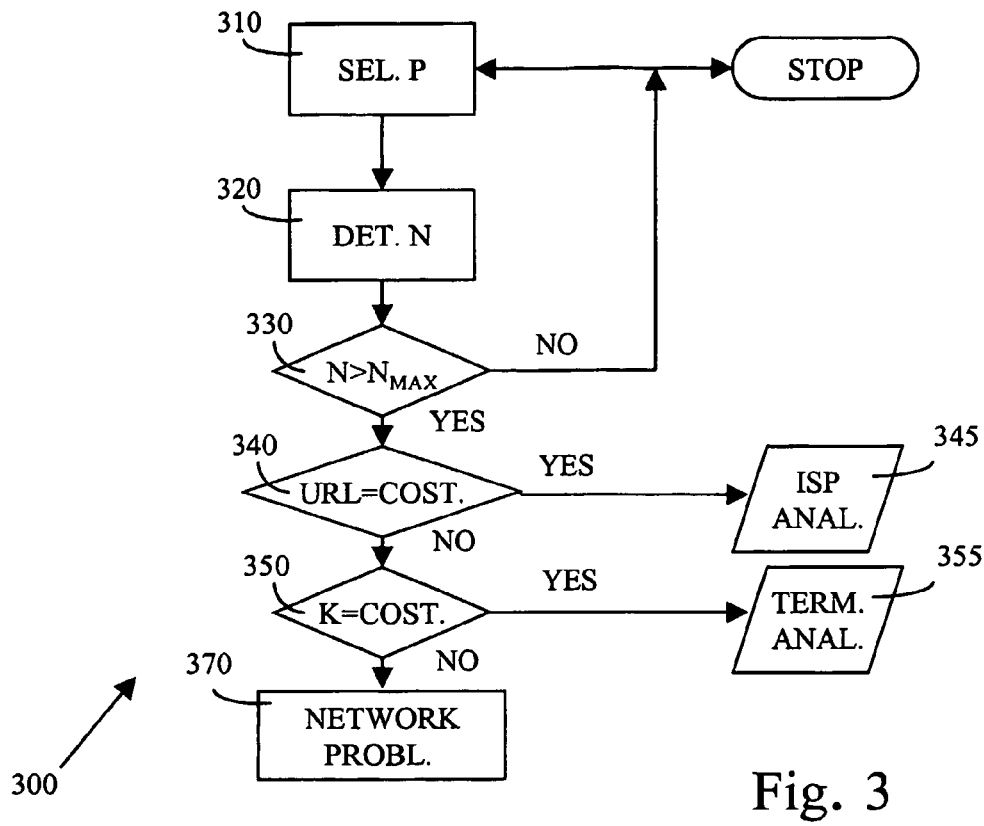

This second example of analysis (300) comprises the steps of:

selecting a determined elementary area of territory P (step 310, FIG. 3), for example an area P with intense traffic and/or signaled by some clients as not meeting QoS requirements;

determining the number of records N (step 320) present in the QoS database corresponding to the selected reference P having identical or equivalent F and 0:

comparing the number N thus determined to maximum number N predetermined or determined on each occasion (step 330);

if N is smaller than or equal to N (negative outcome of the comparison), repeating the procedure selecting an additional reference P (step 310) or completing the analysis function if there are no other areas to select (step STOP);

if N is greater than Nma (positive outcome of the comparison), mutually comparing the URL values (step 340) indicative of the addresses used by the clients in relation to the N records determined in the step 320;

if the URL values are identical or equivalent (CONSTANT) for all N records (positive outcome), starting an analysis procedure aimed at verifying any problems associated with the identified ISP (step 345);

if the URL values are diversified (NOT CONSTANT) for the N records (negative outcome), mutually comparing the references K (step 350) indicative of the characteristics of the terminals and/or of the type of connection;

if the reference K is identical or equivalent (CONSTANT) for all N records (positive outcome), starting an analysis procedure aimed at verifying any problems due to the type of terminal 14 (FIG. 1, FIG. 3) and/or of connection identifying (step 355);

if the reference K is diversified (NOT CONSTANT) for the N records (negative outcome), assigning to the reference area P being analyzed an unreliability or reduced QoS parameter and transmitting a specific notification to any personnel performing technical assistance and/or support functions within the telephone operator organization (step 370).

A third example of analysis (400) is able to allow one to identify, with a determined time interval and by analyzing the QoS database, the causes of insufficient QoS due to the characteristics of the terminal and/or of the types of connection used by the clients.

This type of analysis (400) is particularly effective, for example, in the case of mobile terminals having diversified quality characteristics and/or in the case of Internet services supported by a telecommunications network having different characteristics according to the type of data transport technology and/or client contract.

Figure 4:
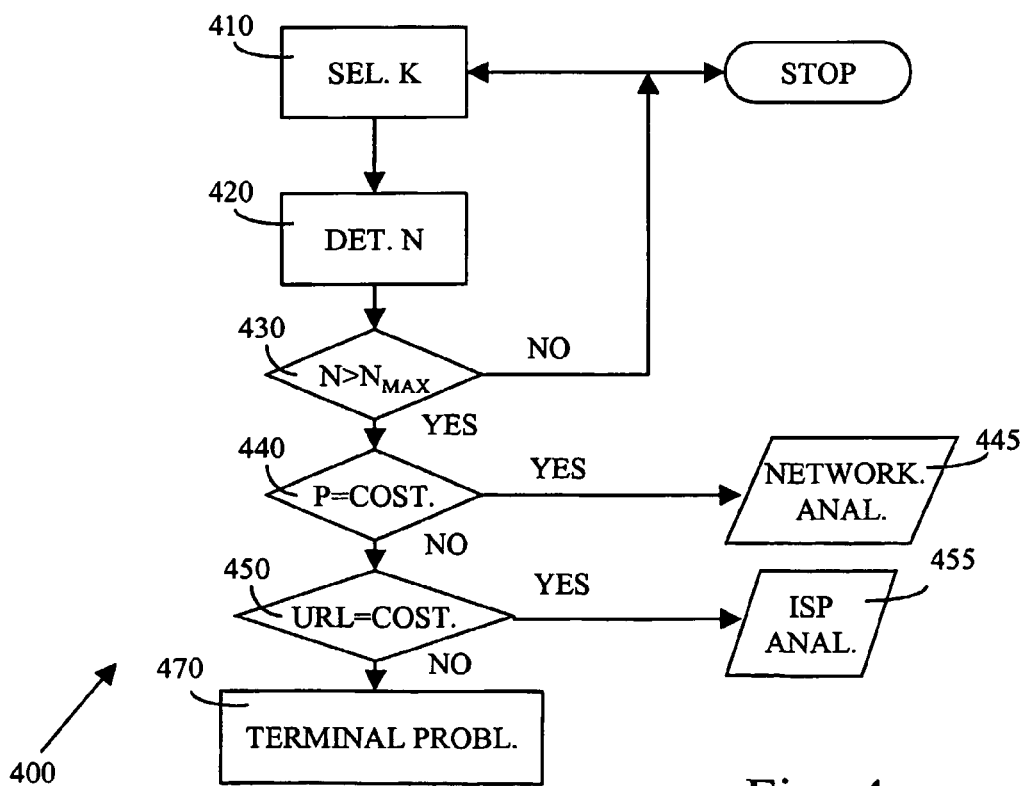

This third example of analysis (400) comprises the steps of:

selecting a determined type of terminal or connection K (step 410, FIG. 4), for example a reference "K" of a terminal type of low quality and/or signaled by some clients as not meeting QoS requirements;

determining the number of records N (step 420) present in the QoS data base corresponding to the selected reference K having identical or equivalent F and 0:

comparing the number N thus determined to a maximum number $N_{MAX}$, predetermined or determined on each occasion (step 430);

if N is smaller than or equal to N (negative outcome of the comparison), repeating the procedure selecting an additional reference K (step 410) or completing the analysis function if there are no other types of terminal or connection to select (step STOP);

if N is greater than $N_{MAX}$ (positive outcome of the comparison), mutually comparing the references P (step 440) indicative of the area in relation to the N records determined in the step 420;

if P is identical or equivalent (CONSTANT) for all N records (positive outcome), starting a network analysis procedure aimed at verifying any connection problems in the identified area P (step 445);

if the reference P is diversified (NOT CONSTANT) for the N records (negative outcome), mutually comparing the values of URL (step 440) indicative of the addresses used by the clients in relation to the N records determined in the step 420;

if the values of URL are identical or equivalent (CONSTANT) for all N records (positive outcome), starting an analysis procedure aimed at verifying any problems associated to the identified ISP (step 455);

if the values of URL are diversified for the N records (negative outcome), assigning to the type of terminal and/or to the type of connection with reference K an unreliability or insufficient QoS parameter and transmitting to the clients messages indicating the causes and/or any solutions to the identified problems (step 470).

Thanks to the automatic procedures described above, the QoS server 20 (FIG. 1, FIG. 2, FIG. 3, FIG. 4) is able, based on the programs developed during the design of the system 10 and of the QoS database stored on the disk 22, to identify the causes of insufficient QoS and to attribute the detected causes to the corresponding architectural elements co-operating to provide the Internet services.

The operation of the system 10 in regard to the collection and transmission of the QoS parameters is as follows.

Figure 5:
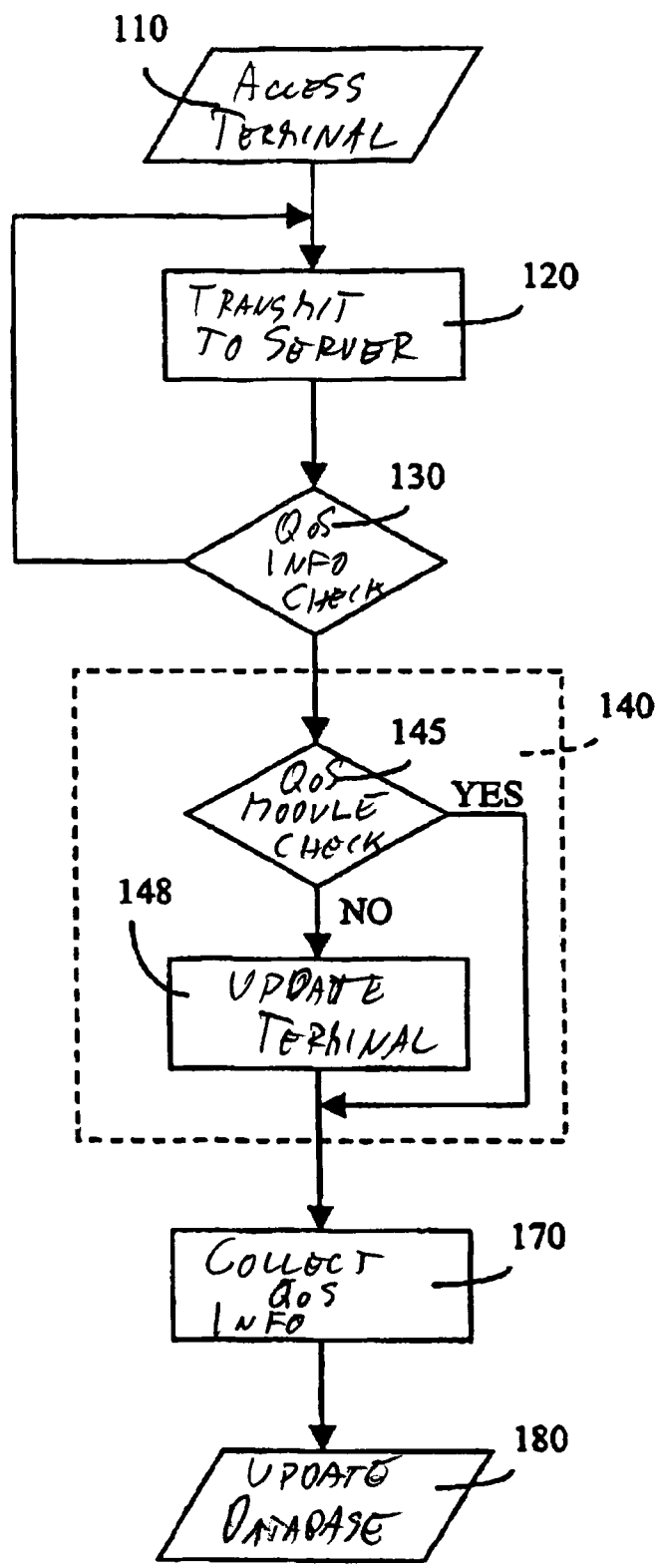
FIG. 5 shows a general flow chart of the system of FIG. 1.

Given a connection of the client, by means of the terminal 14 (step 110; FIG. 1, FIG. 5) the terminal 14 itself transmits to the QoS server 20 (step 120) parameters relating to the established Internet connection.

The QoS server 20 verifies, by means of the interface module or modules, whether the parameters allow one to manage QoS information (step 130) and, if not, it suspends all monitoring function for the ongoing connection.

If they do, it activates the management module or modules residing on the QoS server 20 (step 140). In particular, the QoS server 20 activates a check of the characteristics of the QoS module residing on the terminal (terminal module) of the caller (step 145) to verify whether said module is updated or consistent with the active connection type.

If the outcome of the verification is negative (terminal module not updated) the QoS server 20 by means of the management module activates the update of the terminal module (step 148), before activating the data collection module or modules (step 170).

If the outcome is positive (terminal module updated) the data collection module or modules is (are) directly activated (step 170) by updating the active clients database.

The data collection module (step 170) of the QoS server 20 remains active throughout the duration of the connection in such a way that, if during the Internet functions carried out by the terminal 14 the insufficient QoS threshold is exceeded and the terminal transmits the collected data to the QoS server 20, then it can store the data thus received in the QoS database.

At the end of the connection, the terminal 14 signals its completion to the QoS server 20 so that the QoS server 20 can accordingly update the active clients database (step 180).

Naturally, as will be readily apparent to a person versed in the art, the completion of the connection can also be determined by appropriate Time Outs to take into account any anomalous conditions of the connection.

Thanks to the architecture and to the operation described above, according to an additional characteristic element of the present invention, the server 20 is able, by means of the modules developed during the design of the system 10, to keep updated and, as the case may be, "aligned" the parameters of the correlation function, the correlation function itself and/or the insufficient QoS thresholds, in order to allow both the collection of insufficient QoS data and the analysis of the mutually homogeneous collected data, comparable, for instance, for the same type of connection or ISP.

The system, method and terminal have been described taking as a reference the usage of Internet services, but, as will be readily apparent to a person versed in the art, the invention as a whole is also applicable to the usage of generic services by means of a telecommunications network in which the services are constituted by information or data to be retrieved and in which the QoS as perceived by the client depends on the different architectural elements of the system.

The system, method and terminal have been described taking as reference objective QoS parameters such as time for downloading a complete page, dimensions of the page, number of objects composing the page, and a particular correlation function F, but, as will be readily apparent to a person versed in the art, the invention maintains its validity also in the case of use of objective values and correlation functions of another type.

Obvious modifications or variations are possible to the above description, in dimensions, shapes, materials, components, circuit elements, connections and contacts, as well as in the details of the circuitry and of the construction illustrated herein and of the method of operation without departing from the spirit of the invention as set out in the claims that follow.

The invention claimed is:

1. A system for measuring Q-o-S (Q-o-S) relating to services rendered by means of a telecommunications network comprising:
   at least one terminal comprising access modules able to access the services and to generate and transmit Q-o-S information;
   at least a service apparatus able to provide the services to a user of the terminal through the telecommunications network; wherein the telecommunications network comprises:
      a Q-o-S collecting information device able to collect the Q-o-S information transmitted by the terminal during delivery of the services by the service apparatus; and
   the access modules comprise:
      measuring modules able to measure objective Q-o-S parameters; and
      parameter correlation modules able to estimate with subjective parameters representative of the Q-o-S as perceived by the user of the terminal by means of an expression depending on the objective parameters.

2. The system claimed in claim 1 wherein the telecommunications network further comprises
   analyzing modules able to
      analyze the collected Q-o-S information in order to identify causes of insufficient Q-o-S; and to
      attribute the causes of insufficient Q-o-S to the terminal, to the network, or to the apparatus.

3. The system claimed in claim 1 wherein the telecommunications network further comprises
   terminal updating modules able to update at least the measuring modules.

4. A method for measuring Q-o-S relating to services distributed through a telecommunications network comprising the steps of:
   accessing by a user by means of a terminal able to generate Q-o-S information to a service apparatus able to provide the services;
   collecting by means of the telecommunications network the Q-o-S information generated by the terminal; and
   generating Q-o-S information at the terminal by:
      measuring objective Q-o-S parameters, and
      estimating subjective parameters representing the Q-o-S as perceived by the user of the terminal by means of an expression depending on the objective parameters.

5. The method claimed in claim 4 further comprising the steps of
- analyzing by the telecommunications network the Q-o-S information in order to identify causes of insufficient Q-o-S;
- attributing the causes of insufficient Q-o-S to the terminal, to the network, or to the service apparatus.

6. The method claimed in claim 4 further comprising the step of:
- updating by the telecommunications network the terminal in regard to at least the function of generating the Q-o-S information.

7. A terminal for measuring quality of service relating to services distributed by a service apparatus through a telecommunications network, the terminal comprising:

- a processor;
- first modules, executed by the processor, for generating Quality of Service (QoS) information and having
  - measuring modules for measuring objective QoS parameters; and
  - correlating-parameter modules for estimating subjective parameters representative of the QoS as perceived by a user of the terminal by means of an expression depending on the objective parameters; and
- second modules for transmitting the QoS information to the telecommunications network.

8. The terminal claimed in claim 7 wherein the correlating-parameter modules comprise a correlation function determined experimentally based on statistical data.

* * * * *